United States Patent
Riabov et al.

(10) Patent No.: US 10,885,449 B2
(45) Date of Patent: *Jan. 5, 2021

(54) PLAN RECOGNITION WITH UNRELIABLE OBSERVATIONS

(71) Applicant: International Business Machines Corporation, Armonk, NY (US)

(72) Inventors: Anton Viktorovich Riabov, Ann Arbor, MI (US); Shirin Sohrabi Araghi, Port Chester, NY (US); Octavian Udrea, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/670,098

(22) Filed: Oct. 31, 2019

(65) Prior Publication Data

US 2020/0065687 A1 Feb. 27, 2020

Related U.S. Application Data

(63) Continuation of application No. 14/962,714, filed on Dec. 8, 2015, now Pat. No. 10,552,749.

(60) Provisional application No. 62/258,528, filed on Nov. 22, 2015.

(51) Int. Cl.
*G06N 5/04* (2006.01)

(52) U.S. Cl.
CPC .................... *G06N 5/045* (2013.01)

(58) Field of Classification Search
CPC .................................................. G06N 5/045
See application file for complete search history.

(56) References Cited

U.S. PATENT DOCUMENTS

| | | | |
|---|---|---|---|
| 7,146,348 B2 | 12/2006 | Geib et al. |
| 2003/0139902 A1 | 7/2003 | Geib et al. |
| 2007/0150427 A1 | 6/2007 | Geib |
| 2008/0243570 A1 | 10/2008 | Moorkanat et al. |
| 2013/0185119 A1 | 7/2013 | Palao et al. |
| 2016/0321544 A1 | 11/2016 | Hassanzadeh et al. |

OTHER PUBLICATIONS

Sohrabi, S., et al., "Hypothesis Exploration for Malware Detection Using Planning", Proceedings of the Twenty-Seventh AAAI Conference on Artificial Intelligence, Jul. 14-19, 2013, pp. 1-7.
(Continued)

*Primary Examiner* — Vincent Gonzales
*Assistant Examiner* — Casey R. Garner
(74) *Attorney, Agent, or Firm* — Fleit Intellectual Property Law; Jon Gibbons

(57) ABSTRACT

A mechanism is provided for computing a solution to a plan recognition problem. The plan recognition problem includes the model and a partially ordered sequence of observations or traces. The plan recognition is transformed into an AI planning problem such that a planner can be used to compute a solution to it. The approach is general. It addresses unreliable observations: missing observations, noisy observations (or observations that need to be discarded), and ambiguous observations). The approach does not require plan libraries or a possible set of goals. A planner can find either one solution to the resulting planning problem or multiple ranked solutions, which maps to the most plausible solution to the original problem.

20 Claims, 8 Drawing Sheets

(56) References Cited

OTHER PUBLICATIONS

Sampath, M., et al., "Diagnosability of Discrete-Event Systems", IEEE Transactions on Automatic Control, Sep. 1995, pp. 1-21, vol. 40, No. 9.

Riabov, A., et al., "Planning-Based Reasoning for Automated Large-Scale Data Analysis", Proceedings of the Twenty-Fifth International Conference on Automated Planning and Scheduling, Jun. 7-11, 2015, pp. 1-9.

Cordier, M., et al., "Event-Based Diagnosis for Evolutive Systems", In Fifth International Workshop on Principles of Diagnosis, Oct. 17-19, 1994, pp. 1-6.

Thorsley, D., et al., "Diagnosability of Stochastic Discrete-Event Systems Under Unreliable Observations", 2008 American Control Conference, Jun. 11-13, 2008, pp. 1-8.

Grastien, A., et al., "Exhaustive Diagnosis of Discrete Event Systems through Exploration of the Hypothesis Space", Twenty-Second International Workshop on Principles of Diagnosis, Oct. 4-7, 2011, pp. 1-8.

Grastien, A., et al., "Diagnosis of Discrete-Event Systems Using Satisfiability Algorithms", Jul. 22-26, 2007, Proceedings of the National Conference on Artificial Intelligence, pp. 1-6, vol. 22, No. 1.

Ramirez, M., et al., "Plan Recognition as Planning", Proceedings of the Twenty-First International Joint Conference on Artificial Intelligence, Jul. 11-17, 2009, pp. 1-6.

McIlraith, S., "Towards a Theory of Diagnosis,Testing and Repair", Proceedings of the Fifth International Workshop on Principles of Diagnosis, Oct. 17-19, 1994, pp. 1-8.

Sohrabi, S., et al., "Preferred Explanations: Theory and Generation via Planning", Proceedings of the Twenty-Fifth AAAI Conference on Artificial Intelligence, Aug. 7-11, 2011, pp. 1-7.

Sohrabi, S., et al., "Diagnosis as Planning Revisited", Proceedings of the Twelfth International Conference on the Principles of Knowledge Representation and Reasoning, May 9-13, 2010, pp. 1-11.

Riabov, A., et al., "New Algorithms for the Top-K Planning Problem", Proceedings of the Twenty-Fourth International Conference on Automated Planning and Scheduling, Jun. 21-26, 2014, pp. 1-7.

Haslum, P., et al.,"Diagnosis as Planning: Two Case Studies", Proceedings of the International Scheduling and Planning Applications Workshop, Jun. 11-16, 2011, pp. 1-8.

Ramirez, M., et al., "Probabilistic Plan Recognition Using Off-the-Shelf Classical Planners", Proceedings of the Conference of the Association for the Advancement of Artificial Intelligence, Jul. 11-15, 2010, pp. 1-6.

Pommerening, F., et al., "Optimal Planning for Delete-Free Tasks with Incremental LM-Cut", Proceedings of the Twenty-Second International Conference on Automated Planning and Scheduling, Jun. 25-29, 2012, pp. 1-5.

Nguyen, T.A., et al.,"Generating Diverse Plans to Handle Unknown and Partially Known User Preferences", Artificial Intelligence, Jun. 18, 2012, pp. 1-31.

Srivastava, B., et al., "Domain Independent Approaches for Finding Diverse Plans", International Joint Conference on Artificial Intelligence, Jan. 2007, pp. 1-7.

Bryce, D., "Landmark-Based Plan Distance Measures for Diverse Planning", Proceedings of the Twenty-Fourth International Conference on Automated Planning and Scheduling, Jun. 21-26, 2014, pp. 1-9.

Coman, A., et al.,"Generating Diverse Plans Using Quantitative and Qualitative Plan Distance Metrics", Proceedings of the Twenty-Fifth AAAI Conference on Artificial Intelligence, Aug. 7-11, 2011, pp. 1-6.

Eppstein, D., "Finding the k Shortest Paths", Department of Information and Computer Science, University of California, Irvine, Mar. 31, 1997, pp. 1-26.

Gerevini, A., et al., "Planning through Stochastic Local Search and Temporal Action Graphs in LPG", Journal of Artificial Intelligence Research, Dec. 2003, pp. 1-52, No. 20.

Roberts, M., et al., "Evaluating Diversity in Classical Planning", Proceedings of the Twenty-Fourth International Conference on Planning and Scheduling, Jun. 21-26, 2014, pp. 1-9.

Aslam, J.A., et al., "The Star Clustering Algorithm for Information Organization", Grouping Multidimensional Data, 2006, Springer-Verlag, pp. 1-24.

Xu, R., et al., "Survey of Clustering Algorithms", IEEE Transactions on Neural Networks, May 2005, vol. 16, No. 3, pp. 1-34.

Filippone, M., et al., "A Survey of Kernel and Spectral Methods for Clustering", Pattern Recognition, May 29, 2007, pp. 1-15.

Boutilier et al., "Planning under uncertainty: Structural assumptions and computational leverage." In Proceedings of the second European Workshop on Planning. pp. 157-171. 1995.

Brenner et al., "Continual planning and acting in dynamic multiagent environments." Autonomous Agents and Multi-Agent Systems 19, No. 3 (2009): 297-331. (Year: 2009).

Chen et al., "A planning approach to the recognition of multiple goals." International Journal of Intelligent Systems 28, No. 3 (2013): 203-216. (Year: 2013).

Fraser et al.,"Plan execution in dynamic environments." In International conference on industrial, Engineering and Other Applications of Applied Intelligent Systems, pp. 208-217. Springer, Berlin, Heidelberg. 2005.

Final Rejection for U.S. Appl. No. 14/962,714 dated Mar. 4, 2019.
Non-Final Rejection for U.S. Appl. No. 14/962,714 dated Aug. 8, 2019.
List of IBM Patents or Patent Applications Treated as Related.

PLAN RECOGNITION WITH UNRELIABLE OBSERVATIONS

CROSS-REFERENCE TO RELATED APPLICATION

This application is related to and claims priority to U.S. patent application Ser. No. 14/962,714, entitled "PLAN RECOGNITION WITH UNRELIABLE OBSERVATIONS", filed on Dec. 8, 2015, which is related to and claims priority to U.S. Provisional Patent Application No. 62/258,528, entitled "SOLVING THE PLAN RECOGNITION PROBLEM WITH UNRELIABLE OBSERVATIONS" filed on Nov. 22, 2015, each of these application are assigned to the same assignee, International Business Machine Corporation, and the teachings of each of these application are herein incorporated by reference in their entirety.

GOVERNMENT RIGHTS

This invention was made with Government support under Contract No.: H98230-14-D-0038 awarded by the U.S. Department of Defense. The Government has certain rights in this invention.

SEQUENCE LISTING

A computer program listing of a sample PDDL encoding of the car example. is submitted as an appendix and is hereby incorporated by reference it its entirety in accordance with 37 C.F.R. 1.77 and 37 C.F.R. 1.96.

BACKGROUND

The present application relates generally to an improved data processing apparatus and method and more specifically to mechanisms for computing a plan recognition problem.

Automated planning and scheduling is a branch of artificial intelligence (AI) that concerns the realization of strategies or action sequences, typically for execution by intelligent agents, autonomous robots, and unmanned vehicles. Unlike classical control and classification problems, solutions are complex and must be discovered and optimized in multidimensional space. Planning is also related to decision theory. Planning may be performed such that solutions may be found and evaluated prior to execution; however, any derived solution often needs to be revised. Solutions usually resort to iterative trial and error processes commonly seen in artificial intelligence. These include dynamic programming, reinforcement learning, and combinatorial optimization.

A planning problem generally comprises the following main elements: a finite set of facts, the initial state (a set of facts that are true initially), a finite set of action operators (with precondition and effects), and a goal condition. An action operator maps a state into another state. In the classical planning, the objective is to find a sequence of action operators (or planning action) that, when applied to the initial state, will produce a state that satisfies the goal condition. This sequence of action operators is called a plan.

Plan recognition is the problem of recognizing the plans and the goals of an agent given a set of observations. There exist a number of different approaches to the plan recognition problem including the use of SAT solvers and planning where the domain theory is given as an input as well as the use of techniques that assume a plan library is given as an input. Plan recognition continues to be an important problem to study as it has many practical applications such as assisted cognition, computer games, and network monitoring.

SUMMARY

An artificial intelligence (AI) planning problem consists of a finite set of fluents, the initial state, a set of action operators, and a goal condition. A plan is sequence of actions that achieves the predefined goal. Each action is associated with a cost. Hence the cost of the plan can be calculated by summing up the cost of each action in the plan.

A mechanism is provided for computing a solution to a plan recognition problem. The plan recognition problem includes the model and a set of observations or at least a partially ordered sequence of observations or traces. The plan recognition is transformed, using a transformation algorithm, into an AI planning problem such that a planner can be used to compute a solution to it. The approach is general. It addresses unreliable observations: missing observations, noisy observations or observations that need to be discarded, and ambiguous observations. The approach does not require plan libraries or a possible set of goals. A planner can find either one solution to the resulting planning problem or multiple ranked solutions, which maps to the most plausible solution to the original problem.

The present invention provides multiple benefits over the prior art. One benefit is it allows the use of planning domain description to generate plans that match to observations. Another benefit is that it overcomes the difficulties when dealing with observations that are unreliable, e.g., missing, ambiguous, noisy. That is, in some cases one or more observations could be inconsistent with other observations. This can be, for example, a result of a sensor malfunction, intentional obfuscation by malware, or simply a mistake that an agent makes. From a theoretical perspective, the noisy observations may need to be discarded as it may be impossible to find a plan consistent with all given observations. From a computational perspective, this presents a problem for the previous approach because either the plan that satisfies both goal (G) and complies with an observation (O) that has a much higher cost than the plan that satisfies G and does not comply with O (or complies to just part of the observations in O—the true plan, in this case), or possibly no plan satisfying both the complete O and G exist. The absence of an explicit discarding action leads the system to overestimate the cost of explaining O, and, consequently, to underestimate the probability of G.

Another benefit of the present invention is having possibly long observation sequences, some of which may not be from the shortest or the optimal plans. This can be, for example, a result of redundant activity, or simply an agent that does not always act rationally and choose the shortest plan (like most people). This is challenging for the prior work because they assume that the agent pursuing a particular goal is more likely to follow cheaper plans and as a result their approach quickly discards goals (i.e., assigns $P(G|O) \geq 0$) that are on suboptimal paths. Consider the kitchen domain similar to one described in which there are three goals: preparing breakfast, lunch, and dinner. The agent may choose to have both a salad and a sandwich as opposed to just a salad for dinner, or take their coffee with both sugar and milk as oppose to having it black for breakfast. In both cases, if the observations are selected only from the optimal or the shortest plan, then the goal is either not recognizable (i.e. $P(G|O)=0$), or will be assigned a small probability. Similarly, in the grid domain, long observation sequences that include the agent moving redundantly to the same location is another example where the previous work faces a challenge as shown in the described experiments.

Still, another benefit is the present invention uses of AI planning to solve the plan recognition problem. This permits use of existing planners and to generate alternative plans with top-k planners.

These and other features and advantages of the present invention will be described in, or will become apparent to those of ordinary skill in the art in view of, the following detailed description of the example embodiments of the present invention.

BRIEF DESCRIPTION THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
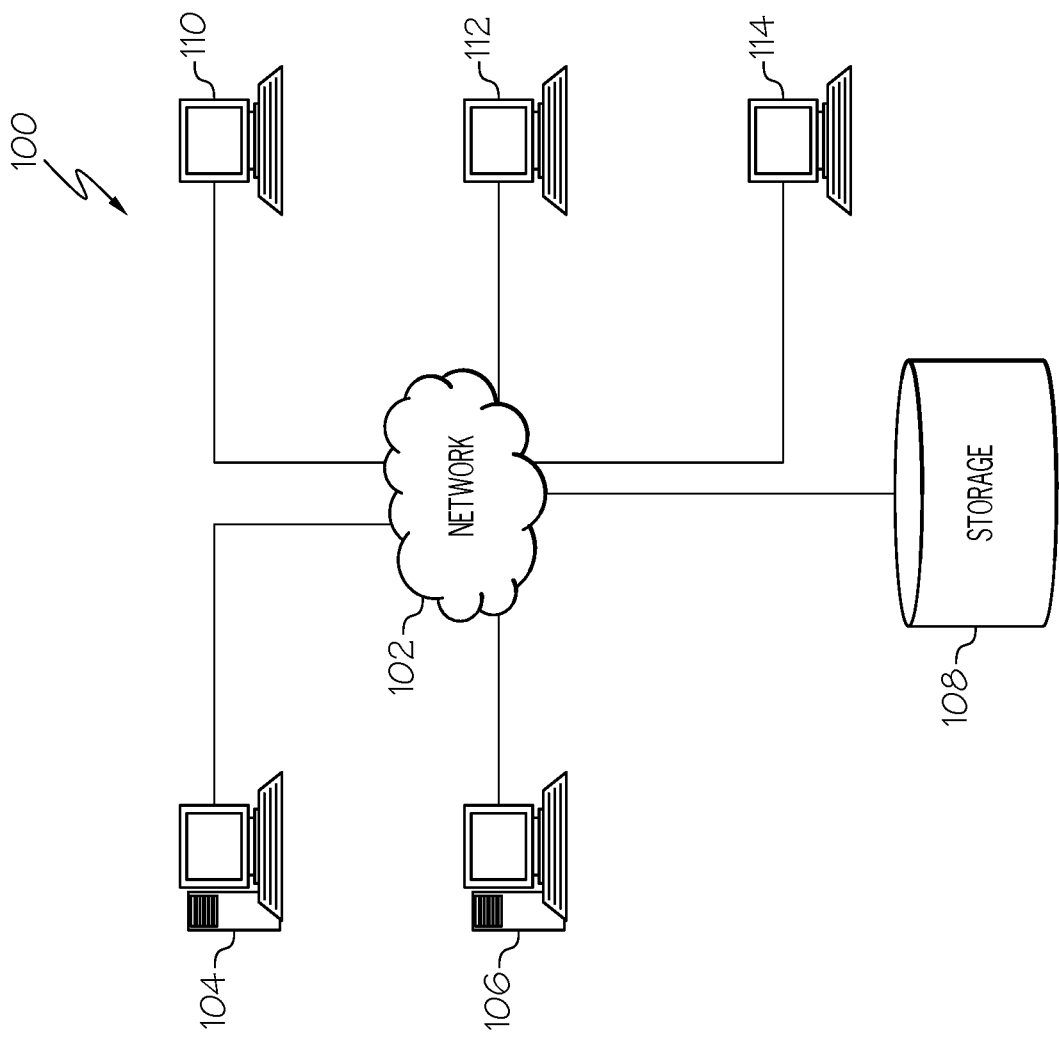
FIG. 1 is an example diagram of a distributed data processing system in which aspects of the invention may be implemented.

Automated planning and scheduling is a branch of artificial intelligence (AI) that concerns the realization of strategies or action sequences. A planning problem generally includes the following main elements: a finite set of facts, the initial state (a set of facts that are true initially), a finite set of action operators (with precondition and effects), and a goal condition. An action operator maps a state into another state. In the classical planning, the objective is to find a sequence of action operators (or planning action) that, when applied to the initial state, will produce a state that satisfies the goal condition. This sequence of action operators may be referred to as a plan.

There are many extensions to the classical planning problem. The illustrative examples are directed to identifying high-quality plans rather than identifying just any plan, as well as identifying a cost associated with action operators utilized in identifying the plan. That is, in the classical planning problem, quality often means shortest plan. Therefore, the best plan, the optimal plan, or the highest-quality plan often means a plan with smallest number of action operators. However, the illustrative examples associate a cost with each action operator, where the cost associated with each action operator is a penalty identified by a numerical value. Hence, the cost of the plan may be calculated by summing up the cost (i.e., the numerical value) of each action operator in the plan. Consequently, high-quality plans are those with the lowest cost and a top subset (k) of those plans, i.e. top-k plans, are the best k plans with the lowest cost.

Therefore, the illustrative examples provide for identifying a set of top-k plans based on the quality of each plan in a set of plans and, amongst the identified set of top-k plans, identifying one or more clusters, i.e. top-m clusters, from the set of top-k plans. In particular, the illustrative examples identify a set of k distinct plans with a lowest cost, where the k distinction plan includes both optimal plans and near-optimal plans, depending on k, and, by definition, for each plan in this set all valid plans of lower cost must also be in the set. The top-k plans are then ranked based on each plans associated quality, i.e. the cost associated with the plan, where the lowest cost identifies the highest quality. The top-k plans are then grouped using clustering techniques into top-m clusters, with a representative set of each cluster being presented with an option of viewing all plans within that cluster.

An action operator maps a state into another state. In the classical planning, the objective is to find a sequence of action operators (or planning action) which when applied to the initial state, will produce a state that satisfies the goal condition. This sequence of action operators is called a plan.

Unlike prior work, the presently claimed invention uses a definition of plan recognition problem considers observations over fluents. The inventors discovered that in many applications the actual actions of an agent may not be observable, instead, their effects through the change in the states are observable as noted in. However, in order to be able to compare directly with prior work, the present invention addresses observations over actions using special unique predicates per each action. Also the plan recognition theory in the present invention explicitly allows observations to be discarded. This is necessary in order to deal with noisy observations. Furthermore, the disclosed plan recognition theory allows both recognition of goals as well recognition of plans.

In order to solve the plan recognition problem using planning, the present invention transforms the original plan recognition problem to a new planning problem with action costs and assume that the costs and likelihood of inferring goals and plans have an inverse relationship. That is, a plan with lower costs is more probable, and subsequently the goal of this plan is more likely. While any planner that addresses costs can be run on this planning problem, the present invention uses planners that instead find a set of plans. Two such planners are used: (1) a diverse planner, LPG-d, and a top-k planner, TK*, that generates a set of high-quality plans. Also describe is how the posterior probabilities P(G|O) can be computed in both cases. The present invention is evaluated. The improvement in goal recognition is shown, especially in the case of noisy observations. In particular, improvement in goal recognition from an average of 58% is demonstrated, with the previous approach, to 91%, with diverse planning, in the benchmark domains. When observations are noisy, goal recognition improved from 38% to 90% with diverse planning. Also shown is that the present invention recognizes plans in addition to goals.

The presently claim invention includes many extensions to the classical planning problem. For example instead of just finding any plan, the presently claimed invention finds high-quality plans. Further the set of action operators may have costs associated with them.

In classical planning problem setting, quality often means shortest plan. Therefore, the best plan, or the optimal plan often means a plan with smallest number of action operators. In contrast, the present invention in one example associates numerical costs to each action operator. Therefore the cost of the plan can be calculated by summing up the cost of each action in the plan. Consequently, the high-quality plans are those with the lowest cost plan.

Prior system use plan libraries. The present invention makes use of familiar concept from the field of AI planning. This invention allows the use of AI planning on the model-based approaches to a number of problems such as plan recognition, diagnosis, explanation generation or more generally any problem in which a model that describes the domain is given along with a partially ordered sequence of observations that could be over the past, present or future.

By turning the plan into a new AI planning problem. The resulting problem can be addressed by any AI planner that is capable of dealing with action costs. Furthermore, multiple plans or solution can be generated using the resulting problem. This can be achieved by any planner capable of producing multiple plans.

The presently claimed invention transforms the original plan recognition problem into an AI planning problem. Furthermore, unlike prior work in which states had to be labeled as good or bad, the presently claimed invention considers the more general multidimensional states. Stated differently the present invention makes use of richer model descriptions.

Also the resulting problem is used differently than prior art systems. In the prior art systems the problem is used to find a distribution over the goals given the observations. The present invention generates alternatives over the past alternative current states and alternative future states.

Non-Limiting Definitions

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

For simplicity the term "plan recognition" is used throughout the disclosure. It is important to note the approach describe can be used on any similar model-based approaches such as diagnosis for example.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Data Processing Environment

Figure 2:
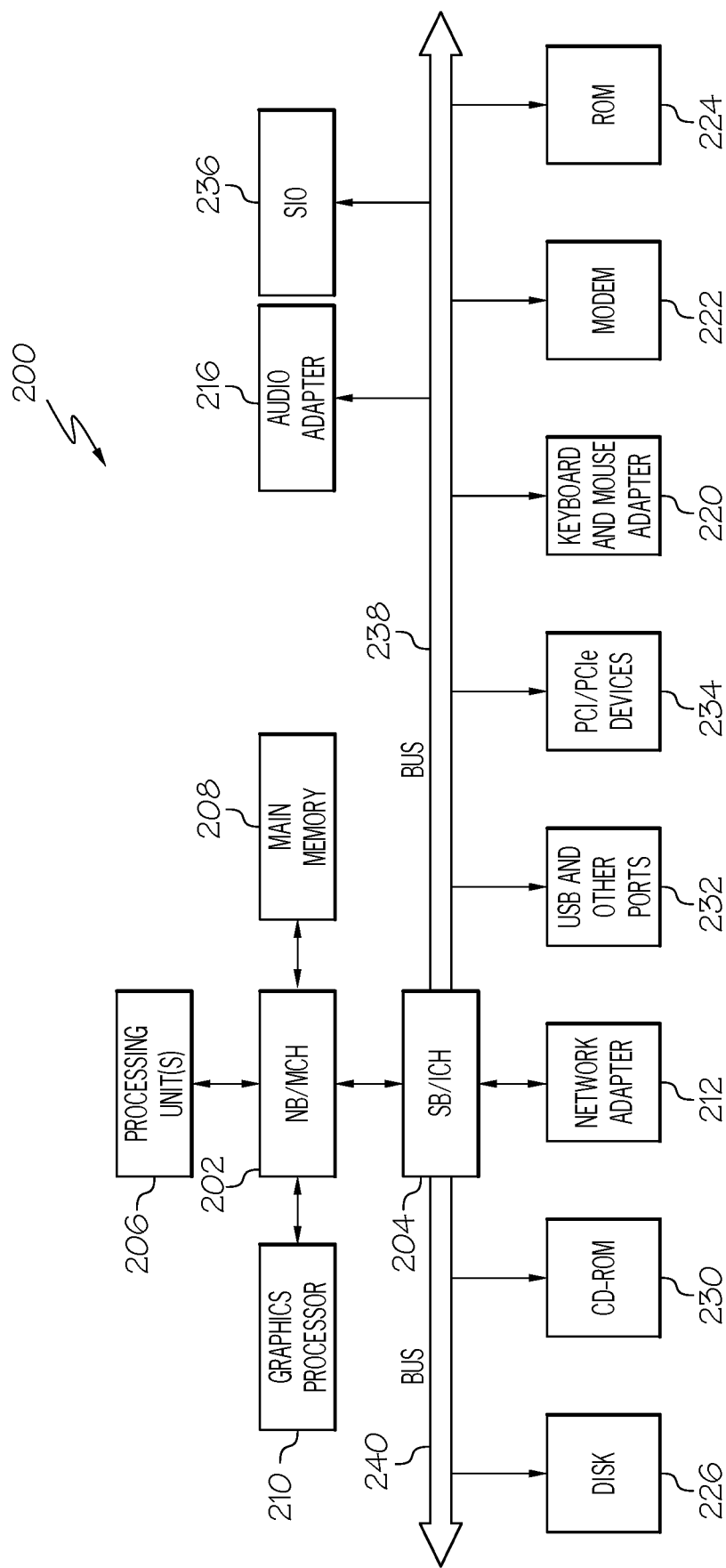
FIG. 2 is an example block diagram of a computing device in which aspects of the invention may be implemented.

Thus, the illustrative embodiments may be utilized in many different types of data processing environments. In order to provide a context for the description of the specific elements and functionality of the illustrative embodiments, FIG. 1 and FIG. 2 are provided hereafter as example environments in which aspects of the illustrative embodiments may be implemented. It should be appreciated that FIG. 1 and FIG. 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7°. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIG. 1 and FIG. 2 may vary depending on the implementation. Other internal hardware or peripheral devices, such as flash memory, equivalent non-volatile memory, or optical disk drives and the like, may be used in addition to or in place of the hardware depicted in FIG. 1 and FIG. 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Identification and Clustering System

Figure 3:
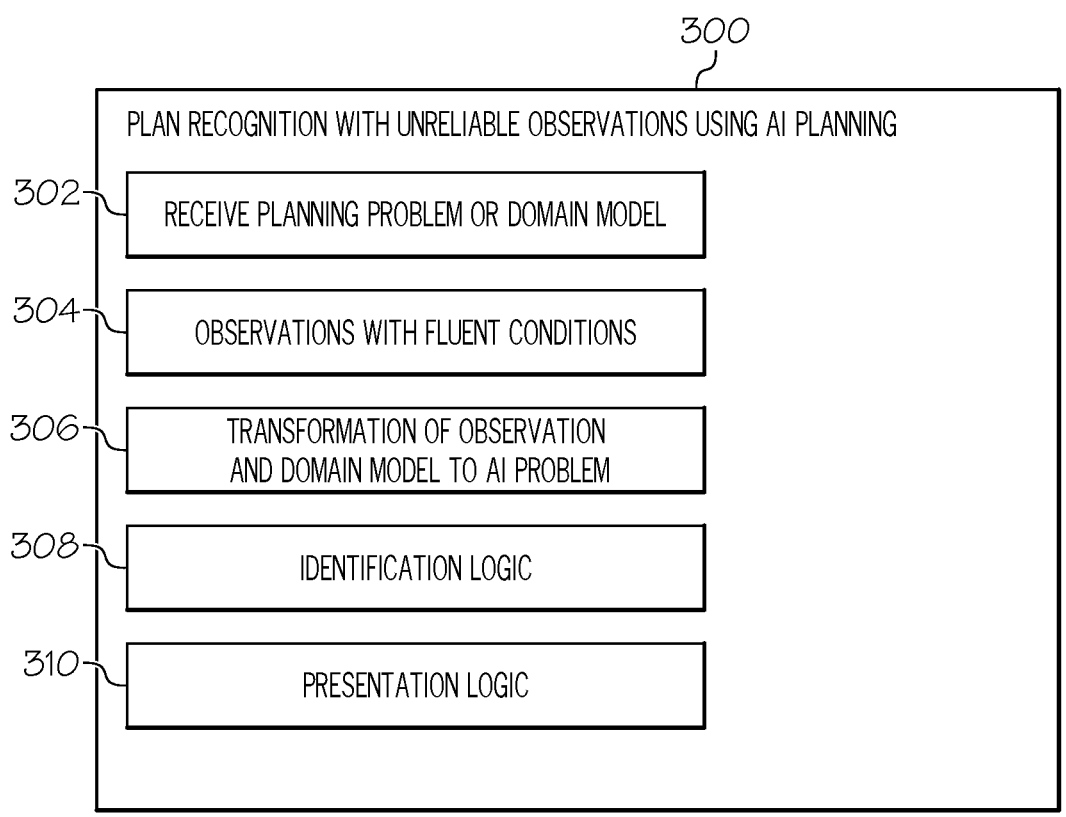
FIG. 3 depicts a functional block diagram of plan transformation to AI planning, plan identification and clustering mechanism.

In order to identify a top subset (k) of a set of high-quality plans based on the quality of each plan in a set of plans and, amongst the identified top-k plans, identify one or more clusters (m) from the set of top-k plans, the illustrative embodiment provides a plan identification and clustering mechanism that identifies a set of k distinct plans with a lowest cost, ranks the identified top-k plans based on an associated quality, and then groups the top-k plans using clustering techniques forming a set of top-m clusters. FIG. 3 depicts a functional block diagram of such a plan identification with unreliable observations using AI planning. The functional block diagram of FIG. 3 may be implemented, for example, by one or more of the computing devices illustrated in FIG. 1 and/or data processing system 200 of FIG. 2. In the initialization of plan identification and clustering mechanism 300, plan identification and clustering mechanism 300 receives a planning problem.

The planning problem, in at least one embodiment, includes a finite set of facts, the initial state (a set of facts that are true initially), a finite set of action operators (with precondition and effects), and a goal condition. This planning problem may be described in, for example, a standard planning language called PDDL (PDDL—Planning Domain Definition Language) or similar.

There are many problems that may be described in a planning problem. For example, travel planning may be described as a planning problem where the initial state is the set of facts true initially, for example, the agent's current location and the amount of money he/she is willing to spend. The set of actions will include the different modes for transportation that will take the agent to various locations. The goal condition will be the agent's desired location. Other problems such as the logistic problem (the problem of transporting packages from an initial location to the goal location using various ways of transportation) can also be described in a planning problem. Received planning problem 302 may hence come from different problems. In one embodiment, received planning problem 302 may be a travel domain or the logistic domain. In further embodiment, received planning problem 302 may be based on a hypothesis generation problem.

Returning to FIG. 3, the functional block diagram, shown is domain authoring 304. A model description, for example in PDDL, would include at least a partially ordered set of observations including fluents that change overtime, the initial state, a set of action operators, and a goal condition. A plan is sequence of actions that achieves the predefined goal. Each action is associated with a cost. Hence the cost of the plan can be calculated by summing up the cost of each action in the plan. A plan is transformed, using a transformation algorithm or knowledge engineering algorithm into an AI planning problem 306. This automated transformation to an AI planning problem, includes modify existing actions to add costs and a special future observation fluent as described further below. The AI planning problems may be in PDDL. Multiple high quality plans are created. During the transformation, new set of actions that address explanation of observations may be added. Also new set of actions that addresses discarding of observations are added. The ordering of the observations is preserved. The initial state and goal state may be updated as well.

Identification logic 308 may use any one of a plurality of algorithms to identify a set of top-k plans, such as, for example, top-k planning via Eppstien's k shortest paths or top-k planning via K* search. Once top-k identification logic 308 has identified a set of top-k plans, plan identification and clustering mechanism 300 utilizes clustering logic 308 to cluster the identified top-k plans. That is, many of the generated top-k plans are only slightly different from each other, such that one top-k plan may be different from another top-k plan by only one or more states that are different. This is because top-k identification logic 308 generates all alternative plans or all possible state transitions, and while this generates distinct plans, not all of the plans are significantly different from each other. Furthermore, the differentiating states in any two plans that are slightly different from each other may be hierarchically related to one another.

Once identification logic 310 has clustered all plans in the top-k plans after the observations and domain model are transformed into an AI Problem in 306. The presentation logic 310 presents the representative plan from each of the clusters to the user. In presenting the representative plan from each of the clusters to the user, if the user selects a particular plan that as additional plans in the cluster, presentation logic 310 presents the other plans in the cluster to the user for the users review.

Overview of Plan Recognition with Domain Theory

This section is organized as follows. First a clear definition of a plan recognition problem and its solution. Next a transformation technique is described that generates a new planning problem with action costs and establish its correspondence to the plan recognition problem. Then described are two methods of finding diverse plans and finding a set of high-quality plans. The experimental evaluations are also discussed.

Before describing the plan recognition problem, a few key differences between the present invention approach and that of prior work: (1) unlike many plan recognition approaches the present invention does not require plan libraries as input. Instead the present invention require a domain theory, (2) observations are considered over fluents in many applications the actual actions of an agent may not be observable, instead, their effects through the change in the states are observable, (3) observations that can be noisy or inconsistent in to ambiguous or missing are considered; and (4) the present invention can infer or recognize both goals and plans, unlike prior work that focused on recognizing only the goals.

In the rest of this section, the plan recognition problem is defined and its solution. But first, a review of the basic elements of a planning problem.

Definition 1 A planning problem with action costs is a tuple P=(F; A; I; G), where F is a finite set of fluent symbols, A is a set of actions with preconditions, Pre(a), add effects, Add(a), delete effects, Del(a), and non-negative action costs, Cost(a), I⊆F defines the initial state, and G⊆F defines the goal state.

A state, s, is a set of fluents with known truth value. An action a is executable in a state s if Pre(a)⊆s. The successor state is defined as $\delta(a; s)=((s\setminus Del(a))\cup Add(a))$ for the executable actions. The sequence of actions $\pi=[a_1, \ldots, a_n]$ is executable in s if the state $s'=\delta(a_n, \delta(a_{n-1}, \ldots, \delta(a_1, s)))$ is defined. Moreover, $\pi$ is the solution to the planning problem P if it is executable from the initial state and $G \subseteq \delta(a_n, \delta(a_{n-1}, \ldots, \delta(a_1, I)))$. Furthermore, $\pi$ is said to be optimal if it has minimal cost, or there exists no other plan that has a better cost than this plan. A planning problem P may have more than one optimal plan. Also note that the tuple (F; A; I) is often referred to as the planning domain.

Definition 2 A plan recognition problem is a tuple R=(P'=(F; A; I); O; ξ), where P' is the planning domain as defined above, $O=[o_1, \ldots, o_m]$, where $o_i \in F$, $i \in [1, m]$ is the sequence of observations, and ξ is the set of possible goals G, G⊆F.

An observation O can generally be expressed as an Linear Temporal Logic (LTL) formula or Past LTL formula. In other words, each observation can in general be a logical expression over the set of fluents and appear as a precondition of an action. While it is possible to address this general type of observations, in this invention observations are at least partially sequenced, or are totally ordered, and such that each observation is an observable fluent. Observations over fluents are more general and flexible than observations over actions, because often in practice, actions are not directly observable, and instead some of the effects of the actions can be observed, for example, through sensors. These observations may be ambiguous since they can be part of the effect of more than one action and can hold true in the state until some other action removes them. However, the present invention also deals with observations over actions by assigning a unique fluent per action that is added only by that action. This is how the present invention is able to directly compare with the prior work which focused on observations over actions.

Definition 3 Let $\sigma = s_0 s_1 s_2 \ldots s_{n+1}$ be an execution trace of an action sequence $\pi=[a_1; \ldots, a_n]$ from the initial state, where $\delta(a_n, s_i)=s_{i+1}$ is defined, for any $i \in [0; n]$. Given a planning domain P', an observation sequence $O=[o_1, \ldots, o_m]$, is satisfied by an action sequence $\pi=[a_1, \ldots, a_n]$ from P', and its execution trace σ if there is a non-decreasing function $f$ that maps the observation indices $j=1, \ldots, m$ into the state indices $i=1, \ldots, n+1$, such that for all $0 \le j \le m$, either:

Case 1 (explained): $o_j \in s_{f(j)}$, or
Case 2 (discarded): $o_j \notin s_{f(j)}$ The above definition deals with both complying with the observation order through the mapping of the nondecreasing function as well as the case where the observation is noisy and may need to be discarded. In one extreme, all observations will be explained by the sequence of states, and in the other extreme, all observations are discarded as it may be possible, but very unlikely, that the execution trace of the action sequence does not explain any of the observations because the observations do not appear as part of the effects of any of the actions. Also note that there may be many such non-decreasing functions and that the definition holds as long as at least one such mapping exists. Moreover, note that the function does not define a one-to-one mapping as there may exist a state that is mapped to multiple observations (i.e., the state explains multiple observations). This can be either because the action produces multiple effects, each of which can be separate observations, or that the previous observation (or the fluent) was never removed from the state, and hence, it can be observed in a later state.

Next, a solution is defined to the plan recognition problem, which is defined to contain both a set of plans and a set of goals. Each plan in this set not only satisfies the observations, but also meets at least one of the given goals. Each goal in the set of solutions is a goal that at least one of the plans meets. The formal definition follows.

Definition 4 Given a plan recognition problem $R=(P'; O; \xi)$, where P', O, and ξ are defined as above, a solution to R is a tuple $(\Pi, \mathcal{Y})$ where Π is a set of plans, and $\mathcal{Y}$ is a set of goals such that:
1. for each action sequence $\pi=[a_1, \ldots, a_n]$, $\pi \in \Pi$, the observation sequence O is satisfied by the execution trace of π, $\sigma = s_0 s_1 s_2 \ldots s_{n+1}$, and there exists at least one goal $G \in \xi$ such that $G \in s_{n+1}$, and
2. for each $G \in \mathcal{Y}$, $G \in \xi$ and there exists a plan $\pi \in \Pi$, such that $G \subseteq s_{n+1}$, where $s_{n+1}$ is the last state in the execution trace of π.

Assuming an implicit relationship between the cost of each plan and the probability that the agent is likely to choose this plan, and subsequently the goal of this plan, posterior probabilities P(G|O) and P(r|G) can be defined. The assumption in the relationship between costs and probabilities is different from that of prior work, this is illustrated in with the kitchen domain. In the kitchen domain there are two types of actions: low-level actions such as "take bread" or "use toaster", and high-level actions such as "boil water" with effect "boiled water" which can be used as a precondition for "make tea" or "make coffee". For breakfast, you need to have cereal, buttered toast, and either coffee or tea. For dinner, you can have a salad (which does not require bread) or a cheese sandwich or both. The effect of the low level actions are observable. This domain has many ambiguous observations such as "take bread" because without further observations, these do not rule out the goals (i.e., the agent can be pursing any of the goals). However, given only the observation "take bread", since the plans for making dinner are shorter than the plans for making breakfast, the approach in this patent is to assign a high probability to the dinner goal and a low probability to the breakfast goal. However, since the agent can have salad as oppose to a sandwich, which is a shorter plan, the prior work assigns a low probability to the dinner goal and a high probability to the breakfast goal even though, there are a number of other observations from making breakfast that is are not given in the observation sequence.

There may be different ways of defining a meaningful cost for each plan. It is assumed that a plan has a higher probability of being selected by an agent if (1) it is shorter that the other plans for the same observation sequence, (2) its execution trace can explain more observations. Therefore, plans are found that explain as much observations as possible.

A very simple probability distribution that can be used to find the posterior probabilities P(G|O) is described which is used in the experimental evaluations. Similar definition can be used to find P(r|G). Note, it is possible to define this based on other more complex probability distributions, but the following definition suffice.

Let $(\Pi, \mathcal{Y})$, be a solution to a plan recognition problem R. Further, let Π* be the set of plans that are in Π that have the lowest cost compared to the other plans in Π. Note, Π* may or may not be the optimal plan set as this depends on the technique used to compute Π. Then for each $G \in \xi$, (G|O) is defined as follows:

$$P(G \mid O) = \begin{cases} \alpha \times 0.5 & \text{if } G \in \mathcal{Y}^* \\ \alpha \times 0.25 & \text{if } G \notin \mathcal{Y}^* \wedge G \in \mathcal{Y} \\ \ldots 0 & \text{otherwise} \end{cases} \quad (1)$$

where α is a normalization constant, and $\mathcal{Y}^*$ is a set of goals achieved by the plans in Π*. The above probability distribution ensures assigning higher probability to the goals that are achieved by the plans of lowest cost, and lower probability or 0 to all other goals.

Transformation to Planning

In this section, a general transformation of the original plan recognition problem into a planning problem with action costs is provided. This transformation allows use of AI planning, in particular, the use of planners capable of finding a plan set, to compute a set of plans and goals for a plan recognition problem.

There are several ways to compile away the observations depending on the nature of observations. For example, if observations are actions then one can take the approach described. Observations can also be compiled away following using a so called "advance" action that ensures the observation order is preserved.

As mentioned earlier, the observations are over the set fluents, so there is no assumption that the action is observable directly. There are however, some fluents that appear as part of a result or an effect of some actions that are observable. It is possible that not all observations are reliable meaning that the resulting planning problem should take into account the case that some observation is out of context or is noisy and hence may be discarded. Also, observations can be are ambiguous, so it may be possible for the same observable fluent to appear as part of the effects of more than one planning action. Ultimately, a solution to the planning problem that is shorter and explains as much observations as possible have a lower cost. So each action will be associated with a cost and a plan with the lower cost is considered the most likely solution.

To create the new planning problem, the existing actions are augmented with a set of "discard" and "explain" actions for each observation oi in the observation sequence O. These actions ensure that the observation was considered while in some cases it may need to be discarded. The order of the observations is preserved by the so called "considered" predicates. Furthermore, at least one of the goals $G \in \xi$ is satisfied by the computed plans. This is done by creating an action for each $G \in \xi$ with a special add predicate referred to as "done". The goal state will be updated to include this "done" predicate. This ensures that the search is restricted and only plans that meet at least one of the given goals are considered.

Definition 5 For a plan recognition problem $R=(P'=(F; A; I); O; \xi)$, a new planning problem is created with action costs $P=(F'; A'; I'; \xi')$ such that:

$F'=F \cup F''$, where $F''=done \cup \{considered_{oi}|o_i \in O\}$, $A'=A_{orig} \cup A_{goal} \cup A_{discard} \cup A_{explain}$, where, $A_{orig}=\{U_a|a \in A \land Cost(U_a)=Cost(a)+c_o\}$, $A_{goal}=\{U_g|g \in \xi \land Pre(Ug)=g \land Add(U_g)=done\}$, $A_{discard}=\{U_{oi}^{discard}|Oi \in O \land Pre(_{oi}^{discard})=\neg(oi) \cup considered_{oi} \land Add(U_{oi}^{discard})=considered_{oi} \land Del(U_{oi}^{discard})=considered_{oj} \land Cost(U_{oi}^{discard})=c_d\}$, $A_{explain}=\{U_{oi}^{discard}|Oi \in O \land Pre(_{oi}^{unexplained})=o_i \cup considered_{oi} \land Add(_{oi}^{unexplained})=considered_{oi} \land Del(_{oi}^{unexplained})=considered_{oi-1} \land Cost(_{oi}^{unexplained})=c_e\}$, $I'=I$, $G'=done \land considered_{om}$, where $o_m$ is the last observation.

Note, $c_o$ is a fixed uniform cost added to all original actions. Generally $c_u$ is in the set $c_e < c_u < c_d$, to ensure that plans that explain as much observations as possible are encouraged. At the same time, each action has a cost so shorter plans are more preferred or are more probable. Note that if the actions in A already had a cost, then the cost is increased by $c_a$. Also note that the above definition deals with any observation $o_i$ that can appear as part of a precondition of an action, and does not necessary have to be a single fluent.

Theorem 1 Given a plan recognition problem $R=(P'=(F; A; I); O; \xi)$, and the corresponding new planning problem $P=(F'; A'; I'; \xi')$ as defined in Definition 5, if the tuple $(\Pi, \mathcal{Y})$ is a solution to R then for all $\pi \in \Pi$ there exists a plan $\pi'$ for P such that $\pi$ can be constructed straightforwardly from $\pi'$ by removing the extra actions (i.e., discard, explain, and goal actions). Similarly, for all $G \in \mathcal{Y}$ there exists a plan $\pi'$ for P that can be constructed by a simple look up of the goal actions in $\pi'$. On the other hand, if there is a plan $\pi'$ for P, then there exists a plan $\pi''$ and a goal G'' that can be constructed straightforwardly from $\pi$ by removing the extra actions and a look up of the goal actions, such that $\pi''$ and G'' belong to the solution space of R.

Proof Sketch:

($\Rightarrow$) Proof is based on the fact that the extra actions do not change any of the observable fluents while preserving the ordering amongst the observations. For each plan$\in \pi$, the observation sequence is satisfied and at least of the goals is met, therefore, there is a sequence of states in the execution trace that either explains or discards the observations and at least one of the goals holds in the final state. Several additional state transitions are added to the original execution trace, as a result of the executions of the extra actions in order to preserve the ordering of observations which make up the plan $\pi'$. ($\Leftarrow$) Given a plan $\pi'$ for P, for each observation explained an action would have to be explained and for each observation that is discarded an action would have to be discarded. Additionally, for each goal satisfied by this plan there is a goal action. If the extra actions are removed, and consider the execution trace of the remaining actions, the observation sequence is still satisfied based on the Definition 3 and the goal holds in the final state. Hence, the stripped version of $\pi'$ from the extra actions, would belong to the set of plans in the solution for R. Furthermore, the goal mentioned in the goal action would belong to the set of goals in the solution for R.

Computation Via Top-k Planning

In the previous section, a correspondence between a planning problem and a plan recognition problem is defined. Further proposed a corresponding planning problem is defined which provides the solution the original plan recognition problem. Moreover, given the set of plans and the set of goals in this solution space, the posterior probabilities can be computed using Equation 1. In the following two sections, two ways of finding a solution to the plan recognition problem is defined using existing planners. In this section, top-k planning and an existing top-k planner is used to compute a set of plans to the corresponding planning problem.

A define top-k planning is defined similar to its definition given in (Riabov et al. 2014). The top-k planning problem is a tuple $T=(P, k)$, where P is the planning problem with action costs as defined in Definition 1, and k is the number of plans to find. Let n be the number of valid plans for the planning problem P. The solution to the top-k planning problem T is a set of plans $\Pi=\{\pi_1, \ldots, \pi_m\}$, such that:

if $k \leq n$, then m=k, otherwise m=n, each $\pi \in \Pi$ is a plan for the planning problem P, and there does not exists a plan $\pi'$ for P, $\pi' \notin \Pi$ such that $cost(\pi_i') < cost(\pi)$ for all $\pi_i \in \Pi$.

Note that the solution to the top-k planning problem, $\Pi$ may contain just one optimal plan (if k=1), all optimal plans (if k equals the number of optimal plans for P), or all optimal plans and some suboptimal plans (if k is large enough). If $\Pi \neq 0$, $\Pi$ contains at least one optimal plan and when k>n, $\Pi$ contains all n valid plans.

Proposition 1 Given a number k, a plan recognition problem R, and the corresponding new planning problem P as defined by Definition 5, if/is a solution to the top-k planning problem (P; k), then $(\Pi', \mathcal{Y})$ is a solution to the plan recognition problem R, where $\Pi'$ is constructed from $\Pi$ such that each plan is stripped from its extra actions, and $\mathcal{Y}$ its a set of goals achieved by $\Pi$.

Note that while the set of plans for the solution of the plan recognition problem is not required to have high quality or be low cost, use of the top-k planning approach is guaranteed to find such a set. In turn, if that the assumption with respect to the inverse relationship between costs and probability of an agent pursing a goal holds, then the use of a top-k planning technique would provide a solution that has the highest posteriors probabilities for both goals and plans. However, cost-optimal planning is a difficult problem and is even more difficult to guarantee finding the top-k plans. Therefore, as seen below in the described experiments, the top-k planning approach does not always yield the best performance which is mainly due to the large search space and that the planner used ran out of time. However, better performance is expected when the search space is smaller. This is often the case in the real-word applications of a plan recognition problem, and/or use a more efficient top-k planner.

There are several techniques to computing the top-k plans. In this example the top-k planning planner called TK* is used that is based on the use of a k shortest paths technique called the K* algorithm as it is shown that this planner outperforms other planners or techniques for top-k planning. K shortest paths problem is an extension of the shortest path problem where in addition of finding one shortest path, a set of paths is found, representing the k shortest paths. The K* algorithm is an improved variant of the Eppstein's k shortest paths algorithm (Eppstein 1998) because it does not require the complete graph of states and actions to be available in memory. Informally, k* search switches between A* and Dijkstra searches to evaluate and find the top-k plans. Its main idea is to keep track of what is called a "sidetrack" edges which indicate how far a partial plan is from the optimal plan. For more details of the k* algorithm please see (Riabov et al. 2014). TK*, applies K* to search in state space, with dynamic grounding of actions, similar to how a planner may use A* search. Soundness and completeness of TK* follows directly from the soundness and completeness of the K* algorithm.

Computation Via Diverse Planning

In this section, diverse planning to compute a set of plans to the corresponding planning problem is used. In diverse planning the objective is find a set of plans m that are at least d distance away from each other. The distance between plans can be computing by considering the plans as a set of actions, a sequence of states, or casual links and defining a distance metric that compares two plans and computes a number between 0 (i.e., the two plans are different) and 1 (i.e., the plans are similar). There are several evaluation metrics defined such as stability, uniqueness, and parsimony that can be used to evaluate the diverse planners.

For the purpose of this patent, diverse planning problem is defined as a tuple D=(m; d), where m is the number of plans to find, and d is the minimum distance between the plans. The solution to the diverse planning problem D is a set of plans Π, such that |Π|=m and for each pair of plans π∈Π, π'∈Π, min δ(π, π')≥d, where δ(π, π') measures the distance between plans. The following is an example of how the distance between plans can be measured, where the plans are compared using their action sets and |A(π)| is defined as a set of actions of π.

$$\delta(\pi, \pi') = 1 - \left| \frac{A(\pi) \cap A(\pi')}{A(\pi) \cup A(\pi')} \right| \quad (2)$$

The following proposition is similar proposition to Proposition 1, in which the top-k planning is replaced with diverse planning. The purpose of this proposition is to define a clear correspondence between diverse planning and a plan recognition problem, which is key to allowing us use diverse planning for the purpose of a plan recognition problem.

Proposition 2 Given a diverse planning problem D=(m, d) a plan recognition problem R, and the corresponding new planning problem P as defined by Definition 5, if Π is a solution to the diverse planning problem D, then Π' is a solution to the plan recognition problem R, where Π' is constructed from Π such that each plan is stripped from its extra actions, and is from its extra actions, and $\mathcal{Y}$ its a set of goals achieved by Π.

There are several techniques to computing the diverse plans and there are several diverse planners that exist. In this patent application, the LPG-d is used for two reasons: (1) it is available and capable of being ran, and (2) it showed relatively better performance compared to the other diverse planners. LPG-d is an extension of the planner LPG which is a local search based planner. Three setting of LPG-d is used, (10; 0:75), (50; 0:5), and (100; 0:75) and report on the evaluation experiments in next section.

Experimental Evaluation

In this section, two proposed approaches against the previous work are evaluated. To that LPG-d is used for diverse planning, TK*, for top-k planning, and LM-Cut (using the most recent download of the fast downward planning system (http://www.fast-downward.org/) with the parameter "-alias seq-opt-lmcut'.) for the previous plan recognition work. The LM-Cut planner is selected because in addition of being able to successfully run it, it has shown to perform well in the planning competition. However, much change is not expected from the results shown by using LM-Cut versus other optimal planning systems. A timeout of 30 minutes is used and ran all these experiments on a dual 16-core 2.70 GHz Intel® Xeon® E5-2680 processor with 256 GB RAM.

Planning Problems

In this experimental evaluation domains from the previous approach (Ramirez and Geffner 2010) were used: kitchen, intrusion-detection, bui-campus, and ipc-grid, and one domain, kitchen-mx, the mutual exclusive version of the original kitchen domain, where the extra actions not achieving the goal are not permitted. That is, if the agent, for example, is pursing the breakfast goal, then they cannot make a salad. The original kitchen domain allowed all actions, hence, in the case of noisy observations, the plan can just include the extra actions necessary to explain the noisy observations. The problems for the kitchen-mx domain are created by manipulating the original domain to disallow the extra "take" actions that are not towards achieving the goal.

For each planning problem in a same domain, a fixed given possible goal set $\xi$ is used. Then for each G∈$\xi$, a set of plans is found for the original planning problem (F; A; I; G). Note that these plans are not necessary all optimal. From these plans, the observable actions are selected in order to construct O, keeping track of the goal used in the planning problem. Therefore, for each problem the ground truth goal is known, or the real goal that agent was pursing. In addition to considering all of the observations, several problems are created that do not have the full observation sequence (i.e., some observation are missing). This is done by randomly selecting 25%, 50%, and 75% of the observations in O. Therefore, the 100% case indicates that the full observation sequence, O, is given. Furthermore, to evaluate how these approaches address noise, two extra observations to the original observation sequence are added. Adding only one observation was tried as well, but the results were similar to the case of extra two observations, therefore, the report is limited to two observations. This is shown by adding "(2)" to the name of the domain. In total five domains and 1048 number of problems are used.

Goal Recognition

Figure 7:
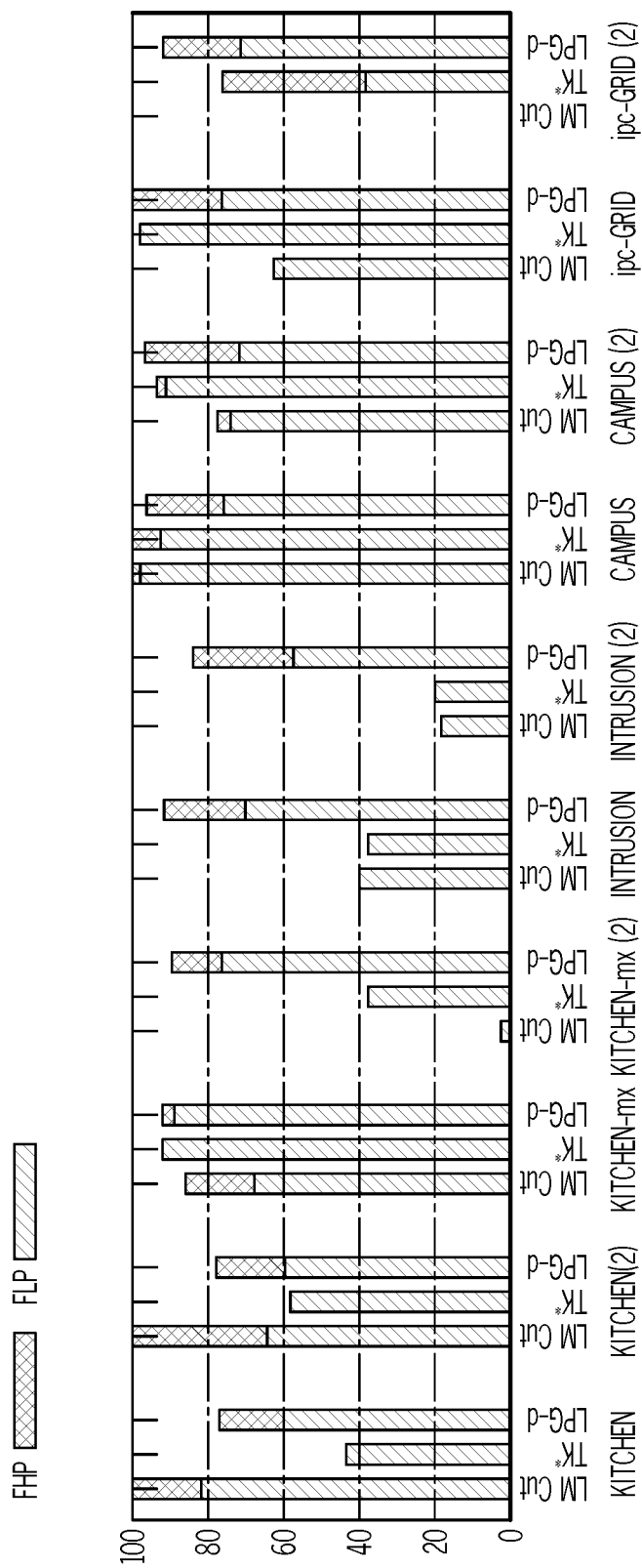
FIG. 7 illustrates a graph of experimental results showing three plan recognition methods.

FIG. 7 illustrates the summary of the experimental results when comparing the proposed plan recognition methods in the present invention for recognizing a goal with the prior work. Comparison of three plan recognition methods for recognizing a goal: (1), using LM-Cut, (2) top-k planning using TK*, and (3) diverse planning using LPG-d. FHP is the percentage of the cases where the ground truth goal was among the highest probability goals found by that method, FHP is the percentage of cases where the ground truth goal was among the highest probability goals found by that method using Equation 1. This is the set of goals in the first case (i.e., G∈$\mathcal{Y}$*). Similarly, the FLP is the percentage of cases where the ground truth goal was among the lowest probability goals found by that method again using Equation 1; this is the set of goals in the second case (i.e., G∈ $\mathcal{Y}$*∧G∈$\mathcal{Y}$). Hence, each bar shows the goal recognition coverage for each method. The bars shown for "(2)" are the result of problems with noisy observations (i.e., there are 2 extra observations). Note, three settings of LPG-d are used, (10; 0:75), (50; 0:5), and (100; 0:75) but report only on the (50; 0:5) results because it performed better than the other two both with respect to recognizing a goal and recognizing a plan. Also k=1000 is used for the top-k planning approach.

The performance of the different methods in the case of missing observations is not reported explicitly in FIG. 7, hence, this is briefly described next. LGP-d performed better in recognizing the goal when given the full observation sequence O; its coverage improved from 86% to 94%. For TK* missing observations did not make a significant difference in goal recognition, but TK* was able to find the ground truth goal with a higher probability when given the full observation sequence. In particular, it was able to recognize a goal with a high probability; its FLP number increased from 54% to 67% when given 100% of O compared to only 25% of O. Hence, more observations helped increase the percentage of finding a ground truth goal with a high probability. For the previous approach, missing observations did not make a big difference on finding the ground truth goal with high probability, however, on average, goal recognition coverage went down from 68% to 61% when given 100% of O compared to only 25% of O. This can be caused by the general poor performance of the previous approach on long observation sequences since the observations may not all come from an optimal plan.

The results shown in FIG. 7 show that the new approach, diverse planning and top-k planning, helped improve the percentage of finding the ground truth goal in many domains, except the original kitchen domain, and more importantly it helped improve the percentage of finding the ground truth goal, in many cases with high probability, when the observations are noisy. As you can see, in many cases, both LPGd and TK* had better goal recognition coverage as shown by longer bars compared to LM-Cut. While, the new approach did well on many domains, it outperformed the previous approach on the ipc-grid domain. In the ipc-grid domain, TK* found the ground truth goal on average 99% of the time no noise, and 75% of the time when observations are noisy. The LPG-d performed even better when observations are noisy; found the ground truth goal 94% of the time. While LM-cut's goal recognition coverage is 64% with no noise, it was not able to find the ground truth goal at all when the observations are noisy.

On average over all the domains as described and all problems, LPG-d found the ground truth goal 91% of the time, TK* found the ground truth goal 65% of the time, and LM-Cut found the ground truth goal 58% of the time. Moreover, when observations are noisy, while the coverage stayed the same for LPG-d, the goal recognition coverage went down to 56% for TK*, and only 38% for LM-Cut. Note that there are a few cases such as the intrusion detection domain that TK* performed worse than LPG-d and this is mainly because of the large search space in this domain. This causes TK* to ran out of time and not find all the top high-quality plans.

In summary, diverse planning and top-k planning helped improve the percentage of finding the ground truth goal in many domains, especially when observations are noisy, compared to the previous plan recognition approach. In particular, an improvement in goal recognition from an average of 58% was observed, with the previous approach, to an average of 91%, with diverse planning, in the benchmark domains described. When observations are noisy, goal recognition improved from 38% to 90% with diverse planning.

Plan Recognition

Figure 8:
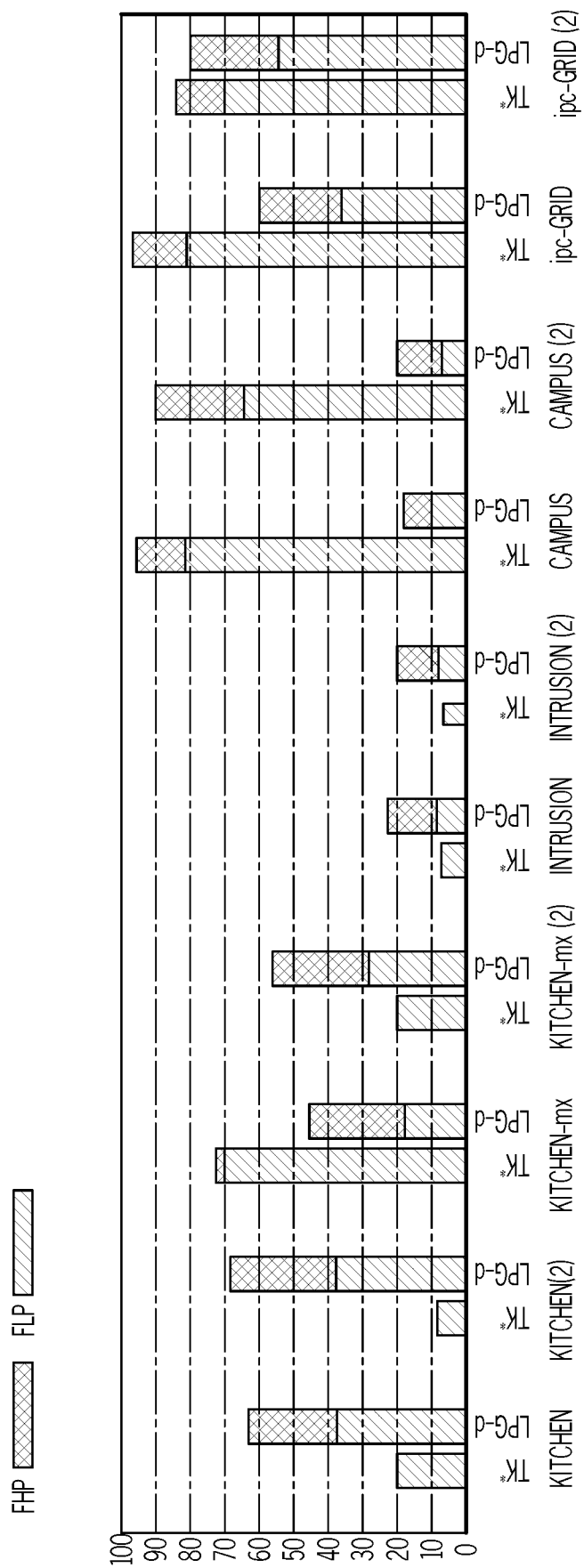
FIG. 8 illustrates a graph of a comparison of two plan recognition methods.

FIG. 8 illustrates the summary of the experimental results when comparing the two proposed plan recognition methods for recognizing a plan, top-k planning and diverse planning. Comparison of two plan recognition methods, top-k planning using TK*, and diverse planning using LPG-d. FHP is the percentage of the cases where the ground truth partial plan was found among the highest probability plans, FLP is the percentage of the cases where the ground truth partial plan was found among the lowest probability plans for that method. Each bar shows the plan recognition coverage for each method on the five benchmark domains. The bars shown for "(2)" are the result of problems with noisy observations.

Note that the prior work focused only on recognizing a goal and so these are not able to be readily compared. Also, in the described benchmark problems the full plan is often very lengthy and finding the exact sequence of actions is difficult. Hence, instead of recognizing the full plan, a random subset of actions is found in the full plan and the objective of the described experiments is to investigate how the two approaches behave when it comes to recognizing this partial plan which consists of both the actions and their orderings. FHP is the percentage of the cases where the ground truth partial plan was found among the highest probability plans and FLP is the percentage of the cases where the ground truth partial plan was not found.

The results show that while LPG-d performed better in some domains, TK* performed better on average over all domains with respect to finding the ground truth partial plan with high probability; TK* found the partial plan with high probability in 43% of the time, while LPG-d found the partial plan with high probability in 25% of the time. This can be because the top-k planning approach focuses on finding a set of high-quality plans and finds 1000 of such plans, while LPG-d finds 50 diverse plans instead and this is helpful in some domains but not all. However, both approaches were able to find the ground truth partial plan in about only 50% of the time on average as this problem was much more difficult for the two approaches. In summary, while the prior work as it stands is not able to recognize plans, shown is the experimental results that the new approach is able to recognize ground truth (partial) plans.

Related Work and Future Applications

While most plan recognition approaches require plan libraries, the use of domain theory has been shown a great promise. Some of the major advantages to use of domain theory that it is more flexible, general, and is less expensive to build. Furthermore, this allows use of AI planning which can scale up well compared to the plan library based techniques.

Besides the use of AI planning, there are several recent techniques including the use of SAT for multi-agent plan recognition, as well as the use of Golog, an agent programming language. However, as it is with most plan recognition approaches, it is often assumed that observations are reliable, despite the fact that they can be missing, noisy, or inconsistent in general. The approach in the present application focuses particularly on addressing noisy observations by extending the prior work both in theory and practice by proposing two plan set generation methods to generate a solution to the plan recognition problem.

Generating a plan set rather than just one plan has gained its popularity in recent years mostly in the context of diverse planning. There are several efficient diverse planning including LPG-d which are used. However, in addition to a diverse planner, a top-k planner is used that is able to generate a set of high-quality plans and compared their performance both in terms of goal recognition as well as plan (or partial plan) recognition. Top-k planning is a more general form of cost optimal planning where instead of finding just one optimal plan, a set of high-quality plans are found.

As described above, this patent application provides a transformation technique that would result in a new planning problem with a solution set that can be transformed by a post-processing step into a solution to the original plan recognition problem. Given the new planning problem, top-k planning and diverse planning to find the set of plans are used. The method and system disclosed in this patent in one example may be extended to tackle the plan recognition problem where actions can have durations. This is a difficult problem especially in presence of concurrency.

The present invention provides: (1) formulation of the plan recognition problem with domain theory that addresses noisy observations, in addition of missing and ambiguous ones, (2) transformation of the original plan recognition problem to a new planning problem with action costs, (3) computation of a solution to the plan recognition problem using both diverse planning and top-k planning (4) experimental comparison of the described approach to the prior work that shows that this new approach is able to improve the chance of finding the ground truth goal, especially when observations are noisy. In particular, shown is an improvement in goal recognition from an average of 58%, with the previous approach, to 91%, with diverse planning, in the described benchmark domains. When observations are noisy, goal recognition improved from 38% to 90% with diverse planning. Also shown is recognizing partial plans.

Overview of Computing a Solution to a Plan Recognition

Figure 5:
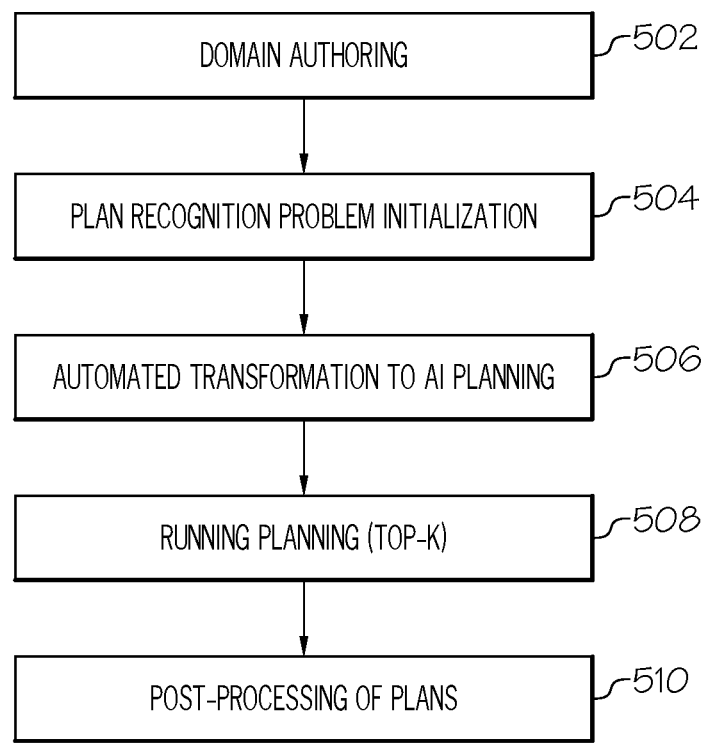
FIG. 5 illustrates a high level flow of the major steps used compute a solution to a plan recognition problem.

FIG. 5 illustrates a high level flow of the major steps used compute a solution to a plan recognition problem. The process begins with accessing a domain model or domain authoring in step 502. The domain authoring includes domain knowledge, model description in PDDL, including a set of fluents. The description of the model or more specifically the set of possible actions with precondition and effects also implicitly defines the set of possible fluents.

Next in step 504, a sequence of observations is received. One or more of the observations are fluent condition that changes over time. Any remaining observations are action conditions that are typically translated into fluent conditions. An optional set of parameters in one example is also received. This optional set includes step size (i.e. months, years). The time horizons are the number of future actions or number of scenarios to generate. Timeouts are also received. These optional parameters in one example are received from a user, and in another example are predefined in a configuration file. Other optional parameters received include an initial state and/or a goal state.

Ultimately, a solution to the planning problem that explains as much as possible the given observations must be higher ranked. So each action in the resulting AI planning problem must be associated with a cost that indicates their rank. A planner or a top-k planner is run to produce high-quality plans rank the plans based on the notion of quality.

The generated plans are then post-processed or translated back to the original plan recognition problem. The representative set of each cluster is presented with the option of viewing all plans within that cluster.

The automated transformation to an AI planning problem, includes modify existing actions to add costs and a special future observation fluent in step 506. The AI planning problems may be in PDDL. Multiple high quality plans are created. During the transformation, new set of actions that address explanation of observations may be added. Also new set of actions that addresses discarding of observations are added. The ordering of the observations is preserved. The initial state and goal state may be updated as well.

In step 508, a planner is run to compute plans. The generated plan is translated by a post-processing step to get the solution to the original problem. This translations is done by the updating the existing actions in the original problem. Adding discard actions for each observation. Adding explain actions for each observation. Ensuring that the ordering of observation is preserved by the actions. Updating the initial and goal state accordingly. Multiple solutions to the plan recognition problem are presented.

Note, neither state nor the actions are observed. Rather, there are some fluent that are observable. If these fluents appear as part of a result/effect of some actions then executing those action will explain the observation. It is possible that not all observations are reliable, meaning that the resulting planning problem should take into account the case that some observation is out of context and hence may be discarded. Also in step 510, post processing of the plans can be run, such as picking the best plan based on costs.

Also some observations may be missing from the trace. Again the resulting planning problem needs to address the case that an action was executed but the observable fluent was not observed or was not amongst the observation of the trace. Finally, observations are ambiguous, so it may be possible for the same observable fluent to appear as part of the effects or results of multiple planning actions. So the resulting planning problem also needs to address this case.

It is possible to have special fluents unique to each action and therefore have observations over actions as well. See the full description of the implementation below for more information on how this can be done.

The benefit of this disclosure is without having a plan library, quickly determine the past observations as well as project into the future. This is possible by the ability to use AI planning as well as having the ability to deal with unreliable observations.

Details of Computing a Solution to a Plan Recognition

A solution is more plausible if it explains more, it is shorter or has minimum number of "unlikely actions". The notion of plausibility can be encoded as the cost of each action and hence, shorter plans are more plausible. Therefore the most plausible solution is the minimum cost plan.

Given the above established relationship between planning and plan recognition. Now the problem of temporally extended goals with observations O is examined and compile observations away in order to use off-the-shelf planning technology that does not address temporally extended goals.

So given:

PDDL encoding of the original domain (the model description).

A set of observations (fluents) given for example in text file (one per line).

The PDDL encoding may include optionally the initial state or a goal state.

Optionally given the number of solutions to compute.

Optionally given a time horizon into the future.

The steps in this patent:

Create a new planning problem in PDDL. If the initial state is not complete or not given, you can complete the initial state. An example is taught by the co-inventor in the publication by Sohrabi et al, Proceedings of the Twenty-Seventh AAAI Conference on Artificial Intelligence at page 8 which is hereby incorporated by reference in its entirety.

Run top-k planner to compute k plans.

Translate the generated plans into solutions for the original problem.

Note: partial-order can be addressed using the encoding proposed in (Haslum, P., and Grastien, A. 2011. Diagnosis as planning: Two case studies. In International Scheduling and Planning Applications Workshop (SPARK), 27-44), which is hereby incorporated by reference in its entirety. Using "pending" and "advance" action. It is assumed for the most part observations are totally-ordered.

The generated set of top-k plans can be further clustered. Many clustering techniques exist. One example of clustering the resulting plans is described in the co-pending U.S. Pat. No. 9,747,550, entitled "Producing Clustered Top-K Plans" with inventors Sohrabi, S., and Udra, O.; Riabov, A. Hassanzadeh, O, commonly owned herewith by International Business Machines, which is hereby incorporated by reference in its entirety. Another example of clustering is described in the co-pending U.S. Pat. No. 9,785,755 entitled "Predictive Hypothesis Exploration Using Planning" with inventors Sohrabi, S.; and Udrea, O.; Riabov, A., commonly owned herewith by International Business Machines, which is hereby incorporated by reference in its entirety.

Transformation Algorithm or Knowledge Engineering Algorithm Example

Using a transformation algorithm to create a new planning problem begins by taking the original set of actions and update them by taking the original set of actions and update them by:

Adding costs to them if no cost is given. If the action already has a cost then increment this cost by a fixed number. (can be uniform, in this example, this cost is set to 10).

(optional): if future actions needs to be created, add a special fluent (o-future) to the actions that can occur in the future.

(optional): if you want to deal with observations over action occurrences, or in another world observations over fluents that result as an occurrence of an action and then disappear after the execution of another action, then you need to have a special fluent (not used elsewhere in the domain) that is added by each of the original action while the previous one is removed. So for example you can have a fluent called "Occ action-name" that is updated (old one is removed, new one is added) for each action.

Add a set of discard action per observation grounding.

Each discard action has a cost higher than max cost of the original actions in the original problem. In one example the cost is set to 2000.

The precondition must make sure the ordering of observations is preserved. This is accomplished by using a special predicate called "considered$_o$" that is added after the observation o is discarded or explained. Also the precondition of the action that corresponds to the observation is expanded that comes immediately before this observation (if any) the predicate considered$_o'$ where o' is the observation before o.

The precondition must make sure the fluent (the observation) is not true at current state.

Add a set of explain actions per observation grounding

Each explain action has a low cost less than min cost of actions in the original problem (in this example this to 1)

The precondition must make sure the ordering of observations is preserved. This is accomplished by a special predicate called "considered$_o$" that is added after the observation o is discarded or explained. Also the precondition of the action that corresponds to the observation that comes immediately before this observation (if any) the predicate considered$_o'$ where o' is the observation before o is added.

The precondition must make sure the fluent (the observation) is true at current state.

(optional): if future actions have to be created, the effect must also remove the o-future fluent. This ensures that for each step into the future a new original action is executed.

(if future actions are created): add one action of type explain action for the o-future fluent (similar to step "add a set of explain action per observation grounding"). Note o-future fluent cannot be discarded, therefore no need to create discard action for o-future fluent.

Update the set of predicate definitions to include the new special predicates.

Update the goal state to make sure the last observation is met (explained or discarded). In implementation the goal to considered$_o$ is set where o is the last observation in the trace.

Plan Identification and Clustering

Figure 4:
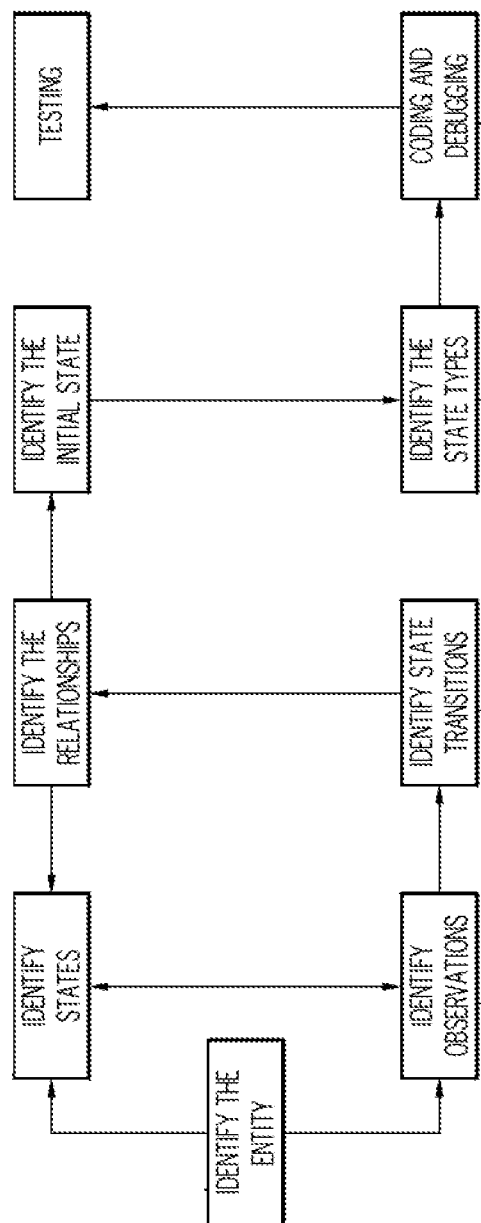
FIG. 4 illustrates a creation of a model description (in at least one embodiment is LTS++ (Labeled Transition System)) by the automated data analysis system.
Figure 6:
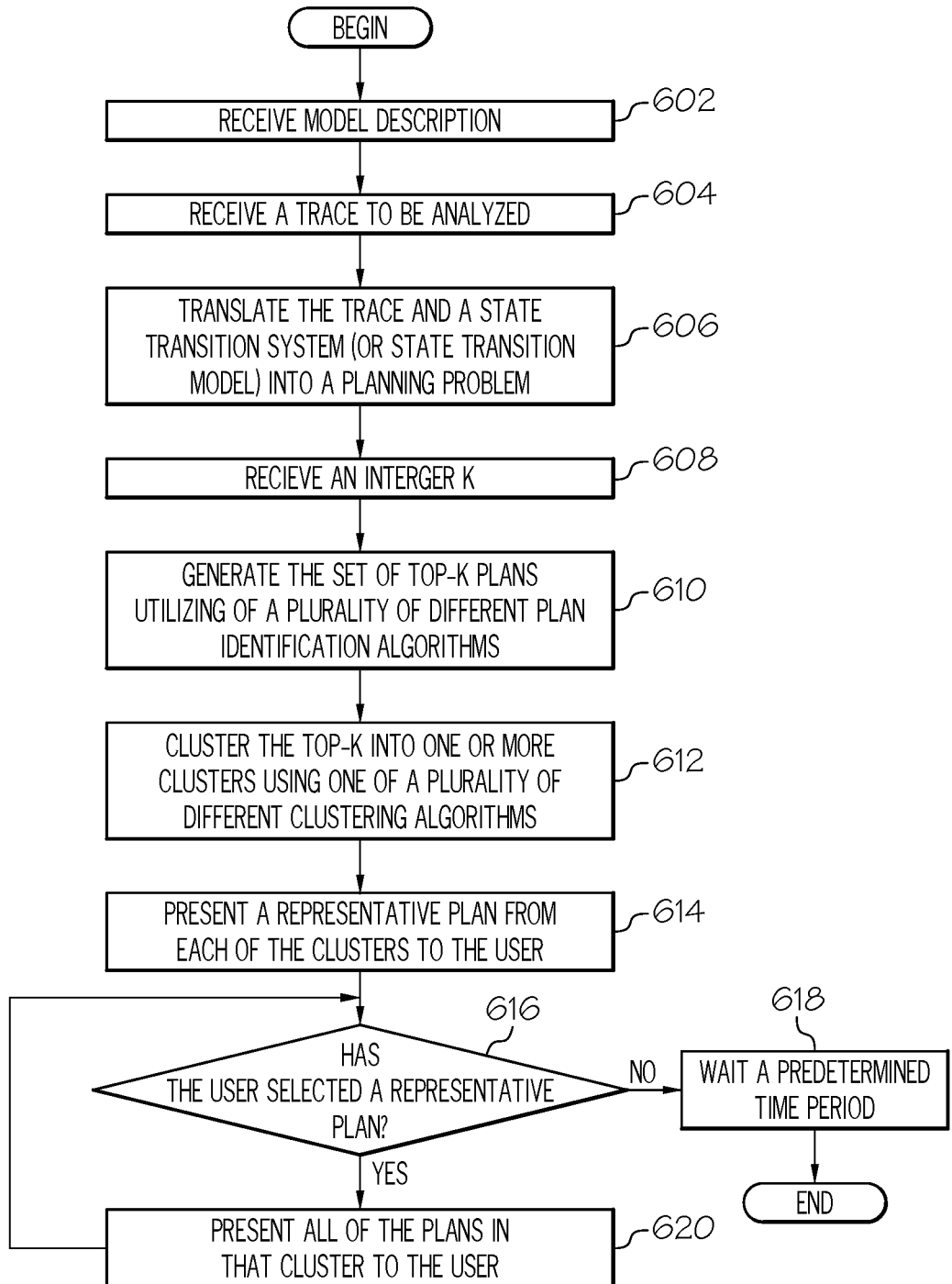
FIG. 6 depicts a flow diagram illustrating the operation performed by plan identification and clustering mechanism in identifying the planning problem from the hypotheses generation problem, in identifying a top subset (k) of a set of high-quality plans and in identifying one or more clusters (m) from the set of top-k plans.

In one embodiment, FIG. 6 depicts a flow diagram illustrating the operation performed by plan identification and clustering mechanism in identifying the planning problem from a hypothesis generation problem, in identifying a top subset (k) of a set of high-quality plans, and in identifying one or more clusters (m) from the set of top-k plans in accordance with an illustrative embodiment. As the operation begins, the plan identification and clustering mechanism receives a model description (step 602), using, for example, the described process in FIG. 4, in accordance with an illustrative embodiment. The plan identification and clustering mechanism receives a trace to be analyzed (step 604). Examples of the source include, but are not limited to, a user, surveillance or monitoring software, medical sensors, electronic medical records system, sensors, or the like. The plan identification and clustering mechanism translates the trace and a state transition system (or state transition model) into a planning problem (step 606), as described above. The state transition system is reusable for multiple traces, and as such may be entered into the system independent of the trace and stored, for example, in memory for retrieval by the system. The plan identification and clustering mechanism also receives an integer k from the user that identifies how many top plans are to be identified (step 608). The plan identification and clustering mechanism then generates the set of top-k plans utilizing one of a plurality of different plan identification algorithms (step 610). Once the set of top-k plans are identified, the plan identification and clustering mechanism clusters the top-k plans into one or more clusters using one of a plurality of different clustering algorithms (step 612). The plan identification and clustering mechanism then presents a representative plan from each of the clusters to the user (step 614). The plan identification and clustering mechanism then determines whether the user has selected a representative plan from one of the clusters (step 616). If at step 616 the user fails to select a representative plan from one of the clusters, then the operation may wait a predetermined time period (step 618) before terminating. If at step 616 the user has selected a representative plan from one of the clusters, then the plan identification and clustering mechanism presents all of the plans in that cluster to the user (step 620), with the operation retuning to step 616 thereafter.

Example Scenario with Pseudo PDDL Encoding

In this scenario where the mission is to hypothesize about the car: what happened to it, what is the current state, and what can be said about the future.

The domain knowledge may include the following:

Car will not start if is out of gas, battery problem, solenoid problem, starter problem.

If you turn on the light in the car and the light does not emit then it could be that battery problem or the light has a problem.

If you turn on the ignition and the car engine makes no noise then it could be that car is not startable due to either gas, battery, solenoid, or starter problem.

If you turn on the radio and the radio does not work, then it could be that radio is broke or battery problem.

Possible observations are:

engine or radio noise, car light emitting, gas level, radio or light or ignition being on or off.

car starting or not starting.

turning on/off the radio or light, starting/stopping the star, filling up gas, using up gas.

Please refer to the Appendix of a Computer Program Listing for a sample PDDL encoding of the car example.

Non-Limiting Examples

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for identifying a set of top-k plans based on the quality of each plan in a set of plans and, amongst the identified set of top-k plans, identifying one or more clusters, i.e. top-m clusters, from the set of top-k plans. In particular, the illustrative embodiments identify a set of k distinct plans with a lowest cost, where the k distinction plan includes both optimal plans and near-optimal plans, depending on k, and, by definition, for each plan in this set all valid plans of lower cost must also be in the set. The top-k plans are then ranked based on each plans associated quality, i.e. the cost associated with the plan, where the lowest cost identifies the highest quality. The top-k plans are then grouped using clustering techniques into top-m clusters, with a representative set of each cluster being presented with an option of viewing all plans within that cluster.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for computing a plan with observations, the method comprises:
    accessing, by a processor, a description of a domain model that incorporates both behavior and data without a planning library;
    receiving a partially ordered sequence of observations, and at least one of the observations is an unreliable observation;
    transforming, by use of a transform algorithm, the partially ordered sequence of observations and the domain model to an artificial intelligence (AI) planning problem, in which each observation can be explained or discarded, and an action associated with discarding an observation in a case of an unreliable observation has a cost associated with it in the AI planning problem that is higher than a maximum cost in an original problem;
    computing a set of at least one plan from the AI planning problem; and
    translating the set of at least one plan to provide a solution by removing any hidden actions therefrom that do not alter the observations that are fluent and preserves an order of the observations.

2. The method of claim 1, wherein at least one or more of the observations is a fluent condition that changes over time when compared to a previous condition and any remaining observations are action conditions.

3. The method of claim 2, wherein the receiving the partially ordered sequence of observations, where the remaining observations are action conditions that are translated into fluent conditions.

4. The method of claim 1, wherein the computing a set of at least one plan from the AI planning problem includes at least one of the plans in the set is a suboptimal plan, and the unreliable observation is discarded while an ordering of the observations is preserved.

5. The method of claim 1, wherein the unreliable observation is one of a missing observation, a noisy observation or an observation that needs to be discarded.

6. The method of claim 1, further comprising:
    identifying a top subset of the set of at least one plan;
    grouping one or more clusters from the top subset of the set of at least one plan using a clustering algorithm;
    presenting representative plans from each cluster on a display;
        receiving a selection of one of the representative plans being displayed; and
        in response to the selected one of the representative plans including more than one plan in the cluster, presenting other plans in the cluster with the selected one of the representative plans.

7. The method of claim 1, wherein the receiving the at least the partially ordered sequence of observations includes receiving observations in which each of the observations is a fluent condition that changes over time.

8. The method of claim 1, wherein the description of the domain model includes a finite set of facts, an initial state, a finite set of action operators, and a goal condition.

9. The method of claim 1, wherein the description of the domain model does not include at least one of an initial state and a goal condition.

10. The method of claim 1, wherein the receiving the at least the partially ordered sequence of observations includes receiving observations in which each of the observations is an ordered sequence and one or more of the observations are
discarded
missing, and
ambiguous.

11. The method of claim 1, further comprising:
accessing, by the processor, an integer K indicating a number of plans to compute; and
wherein the computing the plan includes computing a number of plans equal to K.

12. The method of claim 1, wherein the computing the set of at least one plan includes using a top-K planner.

13. The method of claim 12, wherein a quality of the set of at least one plan is measured by a cost of each plan and selecting at least one plan in the set of at least one plan that has a minimal cost.

14. The method of claim 1, wherein the computing the plan includes using a diverse planner.

15. The method of claim 1, further comprising:
accessing, by the processor, an integer T is indicating a future time horizon of plans to compute; and
wherein the computing the plan includes computing plans with a future time horizon.

16. A computer program product for computing a plan comprising a computer readable storage medium having a computer readable program stored therein, wherein the computer readable program, when executed on a computing device, causes the computing device to perform:
accessing, by a processor, a description of a domain model that incorporates both behavior and data without a planning library;
receiving a partially ordered sequence of observations, and at least one of the observations is an unreliable observation;
transforming, by use of a transform algorithm, the partially ordered sequence of observations and the domain model to an artificial intelligence (AI) planning problem, in which each observation can be explained or discarded, and an action associated with discarding an observation in a case of an unreliable observation has a cost associated with it in the AI planning problem that is higher than a maximum cost in an original problem;
computing a set of at least one plan from the AI planning problem; and
translating the set of at least one plan to provide a solution by removing any hidden actions therefrom that do not alter the observations that are fluent and preserves an order of the observations.

17. The computer program product of claim 16, wherein at least one or more of the observations is a fluent condition that changes over time when compared to a previous condition and any remaining observations are action conditions.

18. The computer program product of claim 17, wherein the receiving the partially ordered sequence of observations, where the remaining observations are action conditions that are translated into fluent conditions.

19. The computer program product of claim 16, wherein the computing a set of at least one plan from the AI planning problem includes at least one of the plans in the set is a suboptimal plan, and the unreliable observation is discarded while an ordering of the observations is preserved.

20. An apparatus comprising:
a processor; and
a memory coupled to the processor, wherein the memory comprises instructions which, when executed by the processor, cause the processor to perform:
accessing, by a processor, a description of a domain model that incorporates both behavior and data without a planning library;
accessing, by a processor, a description of a domain model that incorporates both behavior and data without a planning library;
receiving a partially ordered sequence of observations, and at least one of the observations is an unreliable observation;
transforming, by use of a transform algorithm, the partially ordered sequence of observations and the domain model to an artificial intelligence (AI) planning problem, in which each observation can be explained or discarded, and an action associated with discarding an observation in a case of an unreliable observation has a cost associated with it in the AI planning problem that is higher than a maximum cost in an original problem;
computing a set of at least one plan from the AI planning problem; and
translating the set of at least one plan to provide a solution by removing any hidden actions therefrom that do not alter the observations that are fluent and preserves an order of the observations.

* * * * *